(12) United States Patent
Pribyl

(10) Patent No.: US 11,083,333 B2
(45) Date of Patent: Aug. 10, 2021

(54) APPARATUS FOR OPEN HEAT SOURCE GRILLING

(71) Applicant: Diverse Global Sourcing, Inc., Maple Lake, MN (US)

(72) Inventor: Ralph Pribyl, Maple Lake, MN (US)

(73) Assignee: DIVERSE GLOBAL SOURCING, INC., Maple Lake, MN (US)

( * ) Notice: Subject to any disclaimer, the term of this patent is extended or adjusted under 35 U.S.C. 154(b) by 181 days.

(21) Appl. No.: 14/802,378

(22) Filed: Jul. 17, 2015

(65) Prior Publication Data

US 2016/0045065 A1    Feb. 18, 2016

Related U.S. Application Data

(60) Provisional application No. 62/037,695, filed on Aug. 15, 2014.

(51) Int. Cl.
*A47J 37/04* (2006.01)

(52) U.S. Cl.
CPC .............. *A47J 37/04* (2013.01); *A47J 37/043* (2013.01)

(58) Field of Classification Search
CPC ........ A47J 37/043; A47J 37/04; A47J 37/049; A47J 37/041; A47J 37/0647; A47J 37/0688; A47J 37/0745; A47J 37/0731; A47J 37/0786; A47J 2037/0795
USPC ........................................................ 99/421 R
See application file for complete search history.

(56) References Cited

U.S. PATENT DOCUMENTS

| | | | | | |
|---|---|---|---|---|---|
| 1,683,834 | A | * | 9/1928 | Mayhew | A47J 37/04 452/185 |
| 2,020,808 | A | * | 11/1935 | Speakman | A47J 37/041 126/41 B |
| 2,124,477 | A | * | 7/1938 | Thoeny | A47J 43/18 24/334 |
| 2,198,134 | A | * | 4/1940 | Spiegl | A47J 37/041 126/14 |
| 2,211,024 | A | * | 8/1940 | Nardin | A47J 37/041 99/339 |
| 2,286,394 | A | * | 6/1942 | Togut | A47J 37/041 99/421 H |
| 2,339,690 | A | * | 1/1944 | Farish | A47J 43/18 269/165 |

(Continued)

*Primary Examiner* — Eric S Stapleton
(74) *Attorney, Agent, or Firm* — Westman, Champlin & Koehler. P.A.; Z. Peter Sawicki; Amanda M. Prose

(57) ABSTRACT

Apparatus and method for grilling foodstuffs over an open heat source comprising a stake for securing into a ground surface proximate a heat source; a skewer configured for adjustable connection with the stake; and a clamp configured to secure the skewer in connection to the stake and in a selected position with respect to the stake so the skewer extends substantially perpendicularly to the stake and is positioned over a heat source in a substantially horizontal orientation. The clamp is configured to secure the skewer such that the skewer is prevented from lateral movement with respect to the stake and heat source. A handle extends away from skewer and supports the skewer by clamp arms that prevent unwanted or unaided movement and rotation, while allowing a user to selectively rotate the skewer, exposing various sides of the foodstuff directly to the heat source by turning the handle.

8 Claims, 9 Drawing Sheets

(56) References Cited

U.S. PATENT DOCUMENTS

| | | | | | |
|---|---|---|---|---|---|
| 2,391,571 A * | 12/1945 | Hennessy | A47J 37/041 126/337 R |
| 2,477,183 A * | 7/1949 | Humensky | A47J 37/0745 126/30 |
| 2,485,890 A * | 10/1949 | Keljik | A47J 37/041 99/421 HV |
| 2,494,448 A * | 1/1950 | Nassif | A47J 37/041 99/421 HH |
| 2,501,075 A * | 3/1950 | Miller | A47J 37/041 126/14 |
| 2,505,976 A * | 5/1950 | Leon | A47J 37/041 99/421 HV |
| 2,522,223 A * | 9/1950 | Hardin | A47J 37/0763 126/30 |
| 2,580,549 A * | 1/1952 | Jacobson | A47J 37/049 99/421 H |
| 2,760,428 A * | 8/1956 | Boyajian | A47J 37/041 99/402 |
| 2,845,856 A * | 8/1958 | Sack | A47J 37/0745 126/25 A |
| 2,846,941 A * | 8/1958 | Goodwin | A47J 37/049 126/25 R |
| 2,887,944 A * | 5/1959 | Walker | A47J 37/0745 126/30 |
| 2,935,982 A * | 5/1960 | Otis | A47J 37/0763 126/30 |
| 2,940,439 A * | 6/1960 | Bartels | A47J 33/00 126/25 A |
| 3,019,720 A * | 2/1962 | Topper | A47J 37/0704 99/339 |
| 3,095,869 A * | 7/1963 | Swenson | A47J 37/0772 126/25 A |
| 3,104,605 A * | 9/1963 | McKinney | A47J 37/041 99/421 H |
| 3,205,812 A * | 9/1965 | Booth | A47J 37/041 475/11 |
| 3,254,591 A * | 6/1966 | Cohen | A47J 37/041 74/107 |
| 3,433,151 A * | 3/1969 | Frederick | A47J 37/049 99/394 |
| 3,502,019 A * | 3/1970 | Koons, Jr. | A47J 37/041 74/571.11 |
| 3,527,155 A * | 9/1970 | Renn | A47J 37/049 99/421 H |
| 3,583,307 A * | 6/1971 | Lee, Sr. | A47J 27/08 126/59.5 |
| 3,633,491 A * | 1/1972 | Williams, Jr. | A47J 37/041 99/340 |
| 3,691,937 A * | 9/1972 | Meek | A47J 37/049 99/340 |
| 4,011,804 A * | 3/1977 | Crockett, Sr. | A47J 37/0745 74/84 R |
| 4,078,478 A * | 3/1978 | Geisel | A47J 37/049 99/421 H |
| 4,083,354 A * | 4/1978 | Claire | A47J 37/0772 126/25 A |
| 4,112,832 A * | 9/1978 | Severdia | A47J 37/041 185/38 |
| 4,114,523 A * | 9/1978 | Eff | A47J 37/041 99/340 |
| 4,158,991 A * | 6/1979 | Nakashima | A47J 37/041 403/223 |
| 4,211,159 A * | 7/1980 | Coatu | A47J 37/043 99/421 V |
| 4,270,444 A * | 6/1981 | Geissmann | A47J 37/043 99/341 |
| 4,300,443 A * | 11/1981 | Morcos | B26D 3/28 426/518 |
| 4,326,694 A * | 4/1982 | Destree | B25D 17/28 211/182 |
| 4,409,452 A * | 10/1983 | Oouchi | A47J 37/041 126/338 |
| 4,513,936 A * | 4/1985 | Goulter | A47J 33/00 248/122.1 |
| 4,539,751 A * | 9/1985 | Chan | A47J 43/283 30/322 |
| 4,555,986 A * | 12/1985 | Eisenberg | A47J 37/049 99/427 |
| 4,572,062 A * | 2/1986 | Widdowson | A47J 37/041 126/25 A |
| 4,625,634 A * | 12/1986 | Kruper | A47J 37/049 99/402 |
| 4,717,802 A * | 1/1988 | Colato | H05B 6/6411 126/41 A |
| 4,882,985 A * | 11/1989 | Beller | A47J 37/049 99/426 |
| 4,932,391 A * | 6/1990 | Bierdeman | A47J 37/0745 126/25 A |
| 5,025,715 A * | 6/1991 | Sir | A47J 33/00 126/30 |
| 5,044,144 A * | 9/1991 | Foote, Jr. | G03B 17/26 29/773 |
| 5,048,401 A * | 9/1991 | Hoover | A47J 37/0704 126/25 R |
| 5,119,549 A * | 6/1992 | Foote, Jr. | B23P 21/00 29/281.4 |
| 5,172,628 A * | 12/1992 | Pillsbury | A47J 37/0745 99/419 |
| 5,205,207 A * | 4/1993 | McGuire | A47J 37/041 126/41 B |
| 5,251,543 A * | 10/1993 | Brothers | A22C 17/0006 99/419 |
| 5,287,844 A * | 2/1994 | Fieber | A47J 37/0763 126/30 |
| 5,307,797 A * | 5/1994 | Kleefeld | A47J 33/00 126/30 |
| 5,419,249 A * | 5/1995 | Papandrea | A47J 37/04 99/421 HH |
| 5,667,174 A * | 9/1997 | Adams | A45F 3/44 248/156 |
| 5,715,744 A * | 2/1998 | Coutant | A47J 37/041 99/419 |
| 5,746,334 A * | 5/1998 | Brandenberg | A47B 9/14 211/205 |
| 5,758,570 A * | 6/1998 | Hill | A47J 37/0763 126/9 B |
| 5,769,368 A * | 6/1998 | Busey | A47F 7/17 118/504 |
| 5,862,742 A * | 1/1999 | Bjerg | A47J 33/00 126/25 R |
| 6,047,633 A * | 4/2000 | Khaytman | A47J 37/043 99/419 |
| 6,234,162 B1 * | 5/2001 | Wenker | F24B 1/202 126/29 |
| 6,474,224 B1 * | 11/2002 | Natter | A47J 37/0694 99/419 |
| 6,595,119 B1 * | 7/2003 | Cheung | A47J 37/041 99/386 |
| 6,640,797 B1 * | 11/2003 | Magers | A47J 33/00 126/30 |
| 7,080,811 B2 * | 7/2006 | Thompson | A47J 33/00 126/29 |
| 7,281,469 B1 * | 10/2007 | Barbour | A47J 43/18 211/181.1 |
| 7,341,230 B2 * | 3/2008 | Beaudry | A47G 7/044 248/219.4 |
| 7,347,197 B2 * | 3/2008 | Hankinson | A47J 37/0772 126/25 A |
| 7,823,577 B1 * | 11/2010 | Babjak | A47J 37/0786 126/25 AA |
| 8,087,352 B2 * | 1/2012 | Thompson | A47J 37/041 99/419 |
| 8,272,601 B2 * | 9/2012 | Kocher | A47J 33/00 126/30 |
| 8,342,476 B2 * | 1/2013 | Geinitz | B01F 7/00741 248/117.2 |
| 8,833,704 B1 * | 9/2014 | Neighbors | A47J 36/34 248/37.3 |

(56) References Cited

U.S. PATENT DOCUMENTS

| | | | | |
|---|---|---|---|---|
| 2003/0230200 | A1* | 12/2003 | Cheung | A47J 37/041 |
| | | | | 99/419 |
| 2005/0223910 | A1* | 10/2005 | Hankinson | A47J 37/0772 |
| | | | | 99/419 |
| 2006/0236875 | A1* | 10/2006 | Carr | A47J 37/0786 |
| | | | | 99/485 |
| 2007/0056577 | A1* | 3/2007 | Chang | A47J 37/0713 |
| | | | | 126/25 R |
| 2007/0079709 | A1* | 4/2007 | Giblin | A47J 37/049 |
| | | | | 99/419 |
| 2007/0084353 | A1* | 4/2007 | Hankinson | A47J 37/0772 |
| | | | | 99/441 |
| 2008/0034980 | A1* | 2/2008 | Nardone | A47J 37/0611 |
| | | | | 99/419 |
| 2008/0053425 | A1* | 3/2008 | Stuhlmacher | A47J 37/0786 |
| | | | | 126/30 |
| 2009/0025573 | A1* | 1/2009 | Thompson | A47J 37/041 |
| | | | | 99/421 H |
| 2009/0211936 | A1* | 8/2009 | Korff | A47G 19/08 |
| | | | | 206/459.5 |
| 2009/0241784 | A1* | 10/2009 | Colby | A23G 3/0226 |
| | | | | 99/421 A |
| 2009/0308262 | A1* | 12/2009 | McGuigan | A47J 37/041 |
| | | | | 99/421 R |
| 2011/0097468 | A1* | 4/2011 | Driscoll | A47J 37/047 |
| | | | | 426/519 |

* cited by examiner

5

APPARATUS FOR OPEN HEAT SOURCE GRILLING

BACKGROUND

Roasting or otherwise cooking hotdogs, sausages or other similar type foods over an open flame or other heat source can be time consuming and difficult to fully and evenly do so. Further, cooking food over an open or less controlled heat source such as a bonfire, can be dangerous. A user should not be too close to the flame, so sticks used for holding a hot dog over the flame should be sufficiently long. However, the sticks of the prior art are prone to unwanted turning and rotating, or fail to allow for easy thorough cooking of multiple hotdogs at once.

SUMMARY

An aspect of this disclosure relates to an assembly configured for supporting grillable foods, for example, hotdogs, sausages or marshmallows above a heat source while cooking, wherein the apparatus stabilizes the holder, skewer or fork, during use and prevents unwanted rotation of the skewer. The clamp is further configured with arms such that rotation of the handle of the skewer would allow selective turning of the food during cooking.

Another aspect of the present disclosure relates to an apparatus for grilling food over an open heat source, the apparatus comprising a stake for securing into a ground surface proximate a heat source; a skewer configured for adjustable connection with the stake; and a clamp configured to secure the skewer in connection to the stake and in a selected position with respect to the stake such that the skewer extends substantially perpendicularly to the stake and substantially horizontally with respect to the heat source. The clamp is configured to secure the skewer such that the skewer is prevented from lateral movement with respect to the stake and heat source. The skewer is further adapted with a handle extending away from skewer, which allows the skewer to be supported by the arms of the clamp such that unwanted rotation is prevented while the handle allows a user to selectively rotate the skewer, exposing various sides of the food directly to the heat source by turning the handle.

Another aspect of the present disclosure relates to a method of grilling a food stuff over an open heat source. The method comprises providing a support apparatus having a length and a first end, the first end being a forked end; securing the forked end to a surface near an open heat source such that the support apparatus is secured in a substantially vertical manner and providing a skewer assembly comprising a length and a first end, the first end being configured to support a food stuff. The method also comprises providing a clamp configured to secure the skewer assembly to the support apparatus at a selected position along the length of the support apparatus and wherein the clamp is configured to secure the skewer assembly to the support apparatus in a position substantially perpendicular to the support apparatus. Further, selecting a vertical position along the length of support apparatus and the heat source and securing the clamp at the selected position allows the skewer to be secured to the clamp such that the food support is positioned at a selected height over the heat source.

DETAILED DESCRIPTION

The support device for open heat source grilling of the present disclosure comprises a stake assembly for securing the support device into a ground surface or other surface in which an open source of heat is supported. The stake assemble allows the support device to be positioned near or around an open heat source, such as a bon fire or other heat source suitable for grilling various foods. The support device further comprises a handle and food support assembly. The handle connects to a food support assembly, such as a skewer or other device capable of securing foods for cooking over an open heat source or flame. A clamp assembly allows the position of the handle and food support assembly to be positionable. A user may selectively position the food support assembly at a selected height over the heat source or flame according to the temperature of the heat source or cooking conditions specific to the food being cooked. The user may also use the clamp to select the horizontal position of the food support assembly over the heat source, which allows the user to select a cooking position that may be, for example, directly over the heat source or off-set to one side for slower cooking. The support device also includes an upper portion to the stake assembly which increases the overall height of the support device, allowing the device to be used with various sizes and types of heat sources and allows a user to adjust cooking times and temperatures based at least in part on the food support assemblies position with respect to the heat source. The clamp allows the user to selectively rotate the skewer by turning the handle to evenly cook multiple sides of the food secured to the skewer. The clamp is also configured such that unaided turning or wobbling of the skewer is also prevented.

Figure 1:
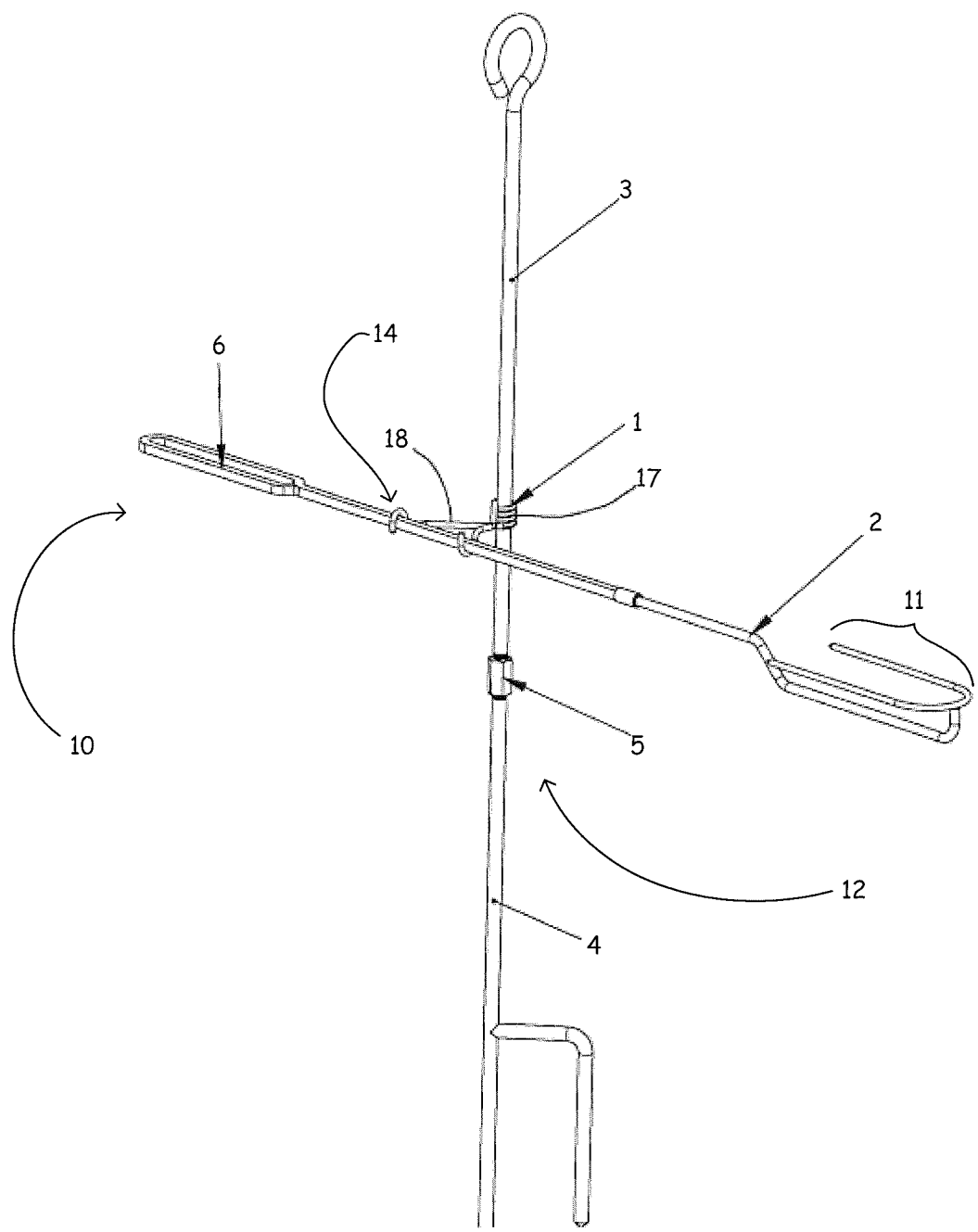
FIG. 1 is a side perspective view of the support device for open heat source grilling according to the present disclosure.
Figure 2A:
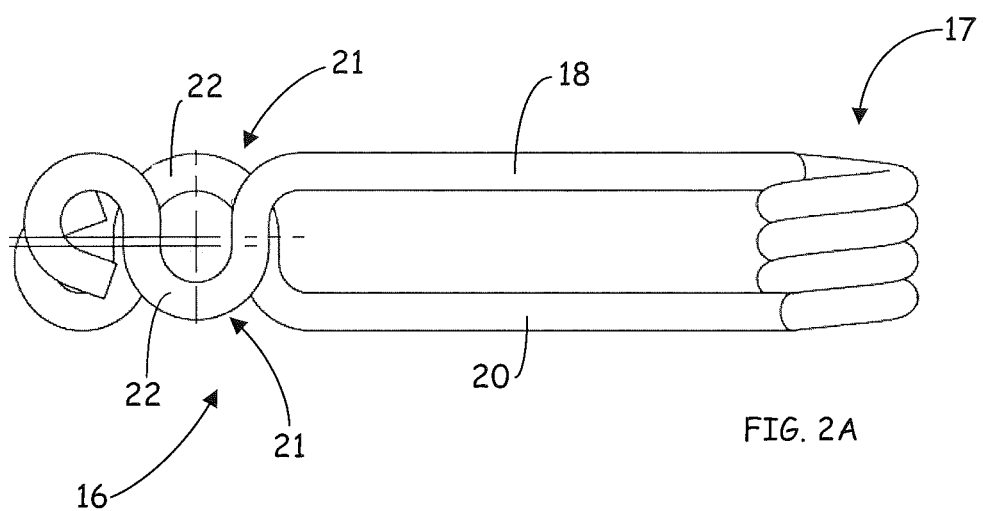
FIG. 2A is a top view of a grill clamp of the support device in a closed position.
Figure 2B:
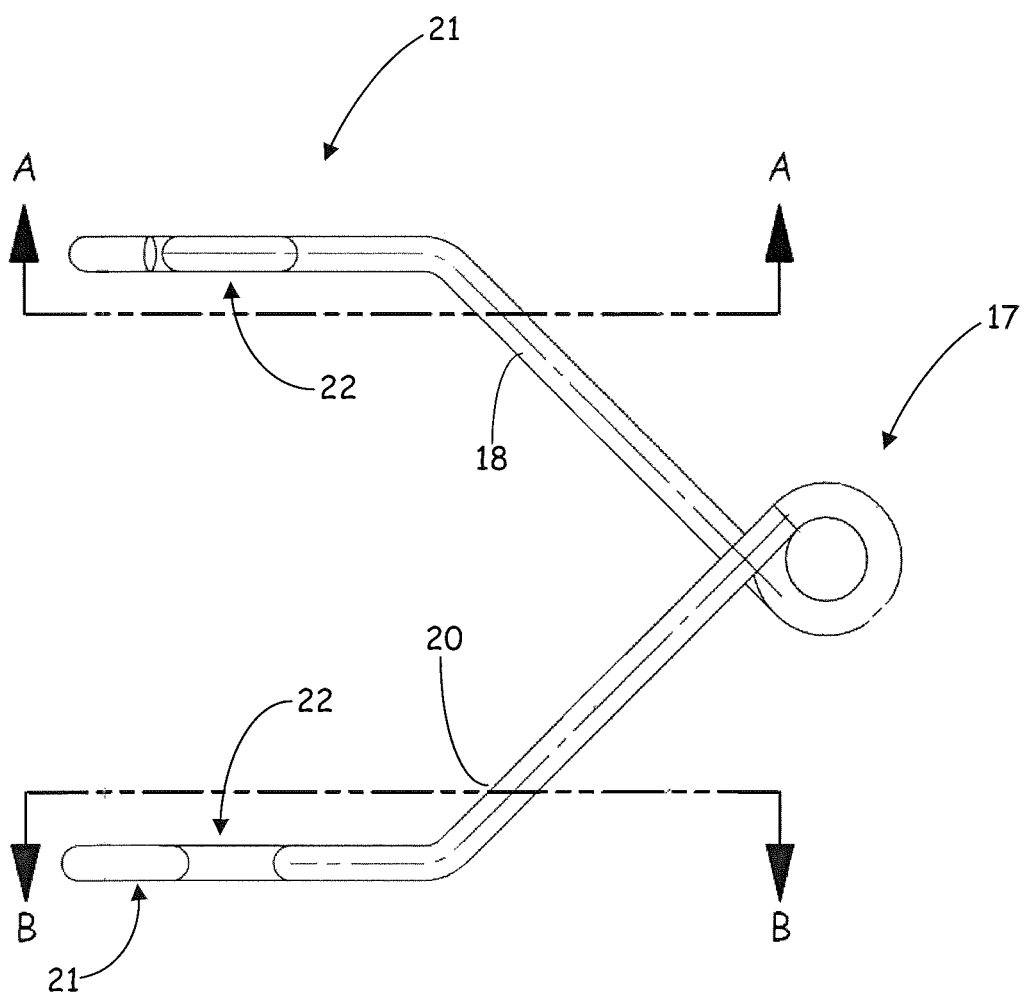
FIG. 2B is a top view of the grill clamp of the support device in an open position.
Figure 2C:
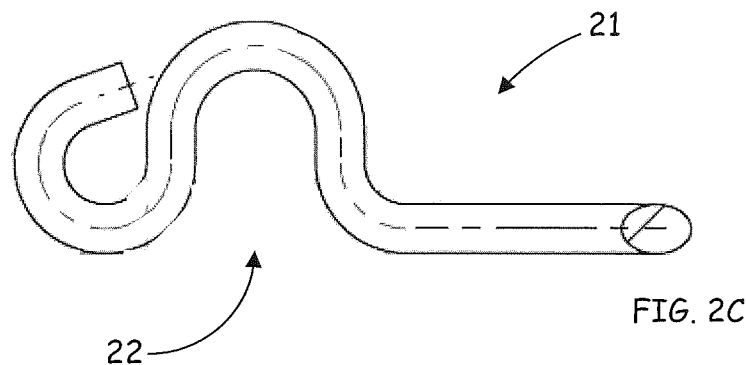
FIGS. 2C-D are side view of the end of the grill clamp.
Figure 2D:
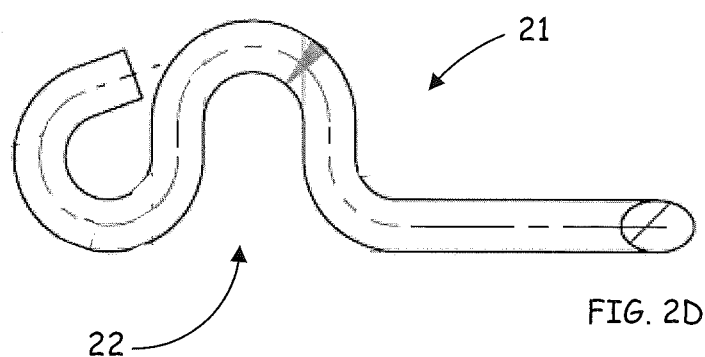
Figure 2E:
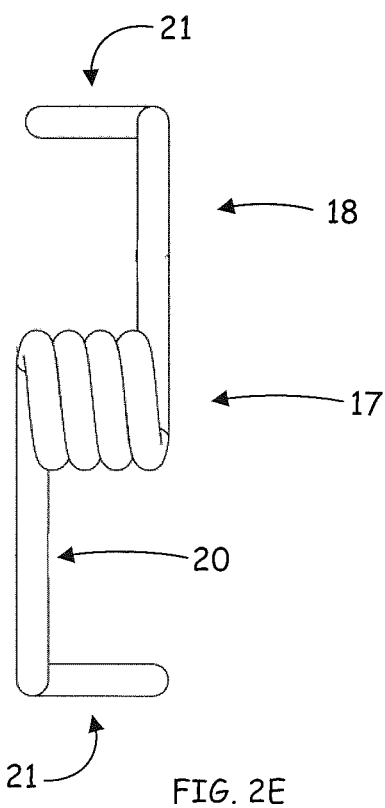
FIG. 2E is a back side view of the grill clamp in an open position.
Figure 3A:
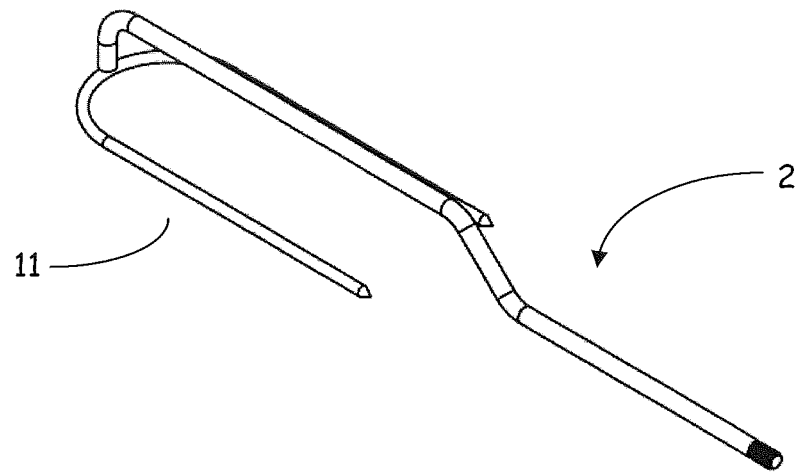
FIG. 3A is a side perspective view of a skewer assembly of the support device.
Figure 3B:
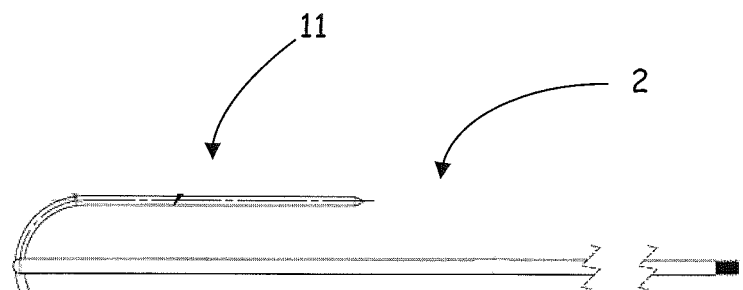
FIGS. 3B-E are an exploded view of the skewer assembly of the support device.
Figure 3C:
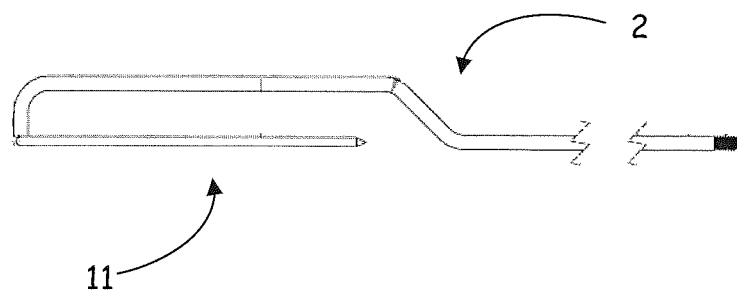
Figure 3D:
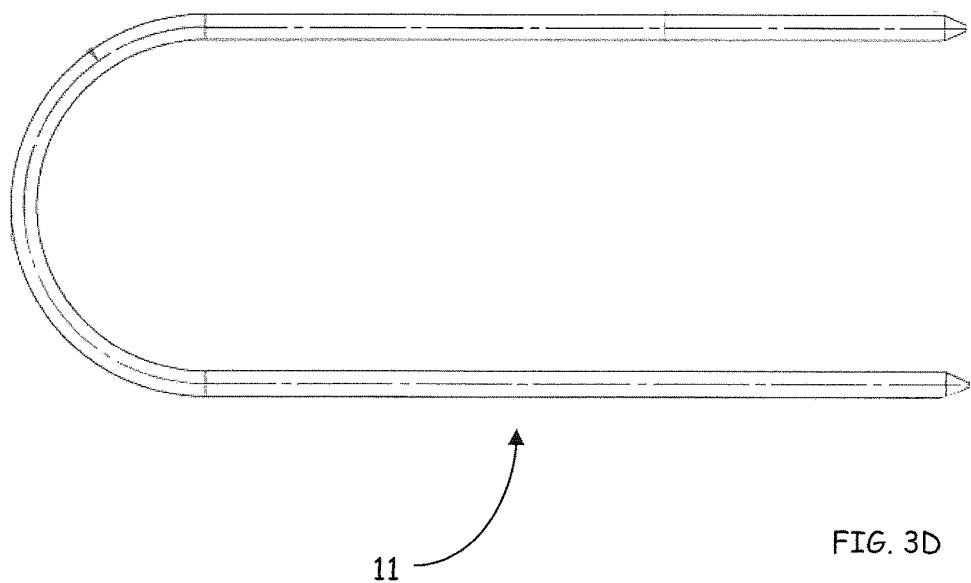
Figure 3E:
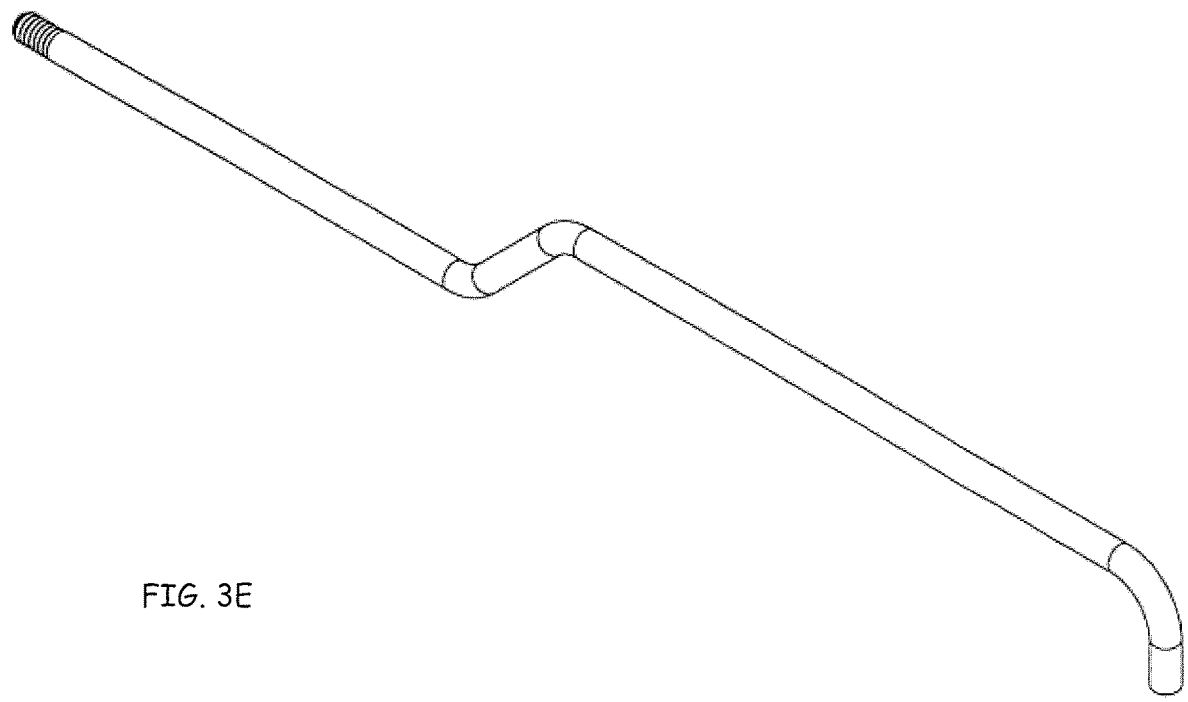

As illustrated in FIG. 1, a support device 10 for open heat source grilling includes a stake assembly 12 and a clamp assembly 1 for holding hotdogs, sausages or other similar foods for roasting, grilling or otherwise cooking over a heat source such as a bonfire. The stake assembly 12 includes a top stake 3 and bottom stake 4 connected by a connector nut 5. The bottom stake 4 can then be secured to or inserted into the ground or base surface near the heating source. Once connected, the top stake 3 allows a skewer assembly 14 to be attached to the stake assembly 12 by a clamp 1. The clamp 1 allows the skewer assembly 14 to be secured at varying heights depending on cooking considerations including the size of the heat source, height of the flames, the food to be cooked or the desired doneness of the food.

The clamp assembly 1 is illustrated in further detail in FIGS. 2A-2E. The clamp assembly 1 includes a coil spring 16 having a coil member 17 and arms 18 and 20 extending from opposite ends of the coil member 17. The arms 18 and 20 are similarly shaped and each arm has a terminal end portion 21. Each terminal end portion 21 includes a bend 22 in the shape of a "u" preferably with the "open" portion of the "u" of each arm facing in an opposite direction from the "u" of the other arm. The end of each arm is then bent toward the "u" to form a loop 23. The arms 18 and 20 are configured with respect to the coil member 17 such that when the arms 18 and 20 are squeezed towards each other the diameter of the coil member is enlarged. When the arms are released the coil member is at "rest", the diameter of the coil member then being slightly less than the diameter of the top stake 3.

The clamp assembly 1 is removably secured to the stake assembly 12 by squeezing the arms 18 and 20 to enlarge the coil member diameter and sliding the clamp assembly 1 onto the upper stake 3. The arms 18 and 20 are then released resulting in the coil member 17 frictionally engaging the stake 3.

The amts 18 and 20, due to the construction of the clamp assembly, extend in a perpendicular fashion from the stake assembly 12. The skewer assembly 14 is secured to the stake assembly 12 by an under-over connection with the clamp assembly 1. The bends 22 in the arms 18 and 20 act to hold the inserted skewer length substantially perpendicular to stake assembly 12. The skewer assembly 14 is first inserted into one of the bends 22 and then into the other bend 22. There is a slight frictional engagement between the bend and the skewer assembly to help retain the assembly 12. The clamp 1 and arms 18 and 20 comprise an assembly that holds or secures the skewer in a generally horizontal position at a vertical height determined by the selected position of the clamp 1 along the stake 12. The skewer assembly 14 can be held at various positions along its length to adjust the position of the skewer over the heat source. For example, the skewer assembly can be secured at a selected height over a heat source and a selected position over the heat source (i.e. directly over the center of the heat source, off-set to a side of the heat source etc.). The arms 18 and 20 are also configured to prevent the skewer assembly 14 from unwanted wobbling, tipping or turning. However, the arms 18 and 20 allow a user to affirmatively and selectively turn the skewer to rotate the skewer and thus a cooking surface for even grilling by rotating a handle section of the skewer opposite the end positioned over the heat source.

The skewer assembly 14 comprises a food support surface, which may be, for example, a skewer or a plurality of skewers 11 that can be secured at a selected height by squeezing and releasing the arms of the clamp assembly to enlarge the diameter of the coil member 17 and then sliding the clamp assembly to the selected height. The arms are then released so that the coil member 17 frictionally engages the stake 3, with the fork 11 extending out and over the heat source. The clamp 1, in addition to holding the skewer assembly including the skewer 2 over the heat source also prevents the skewer from turning, rotating, bending or otherwise moving.

The skewer is illustrated in further detail in FIGS. 3A-3E and comprises a substantially "U" shaped length of metal as skewers 11 have pointed tip ends for inserting into food and securing the food to the skewer for cooking. The "U" shaped length, also referred to as skewer or fork 11, is then permanently secured or welded to a skewer length which extends under the fork and includes an upturned terminal end for securing to the curved portion of the fork, opposite the tipped ends such that the fork is welded to the skewer above the skewer length and in parallel with the skewer length so the food held by the fork for cooking is held away from, and above the skewer 2. The food support surface thus may be forked, or comprising two or more tines for insertion into or otherwise securing or supporting one or more food items.

Figure 4:
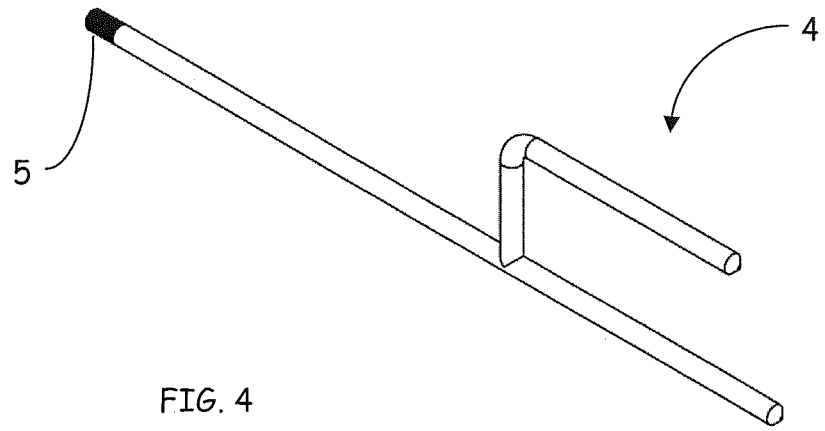
FIG. 4 is a side perspective view of a bottom section of a stake assembly.
Figure 8:
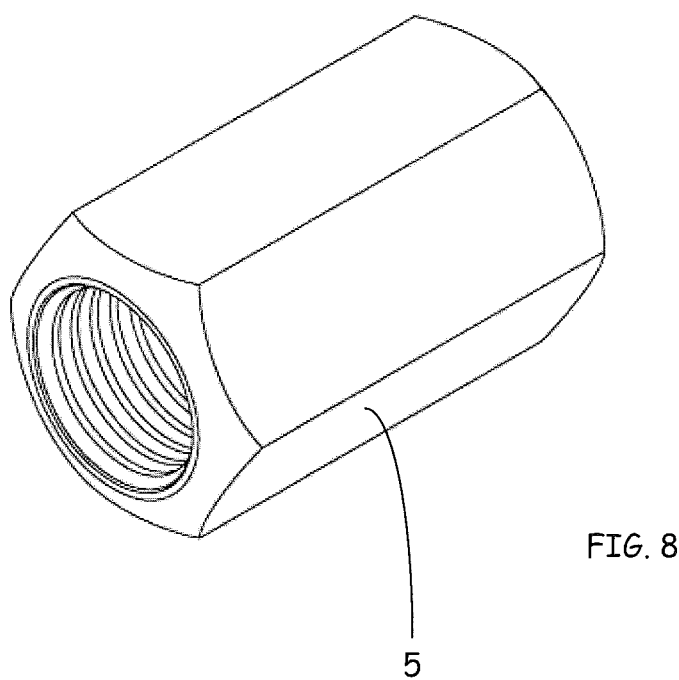
FIG. 8 is a perspective view of a stake connector of the support device.

As illustrated in further detail in FIG. 4, the assembly comprises bottom stake 4 which may be a tube of stainless steel or aluminum having a forked lower end so that the bottom stake can be inserted into the ground or base surface and secured such that the full assembly 10 can be secured and held in an upright position with the attached skewer assembly 14 over the heat source when used. The upper terminal end of the bottom stake 4 comprises a threaded length for connection with the upper stake 3. A connector is used to assemble the stake assembly 12 by attaching the top stake 3 and bottom stake 4 by, for example, a threaded nut 5 as illustrated in FIG. 8. This allows the assembly to be assembled on site, proximate the heating source or bonfire while allowing the assembly to be disassembled for portability and cleaning.

Figure 5:
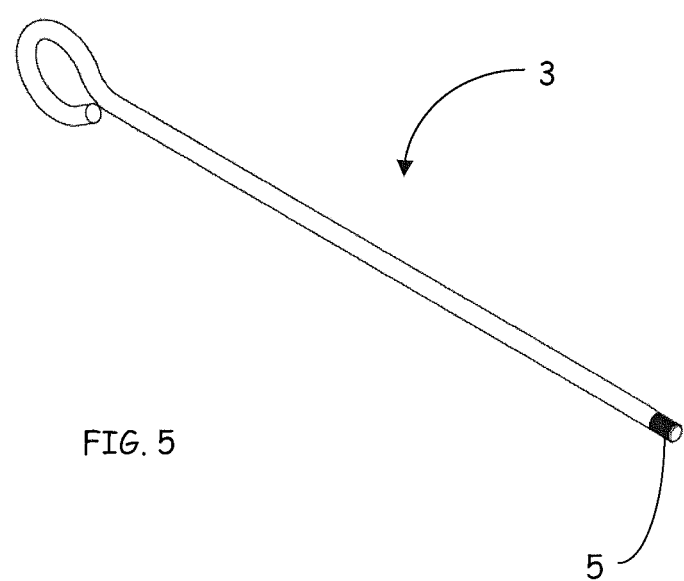
FIG. 5 is a side perspective view of a top section of the stake assembly.
Figure 6A:
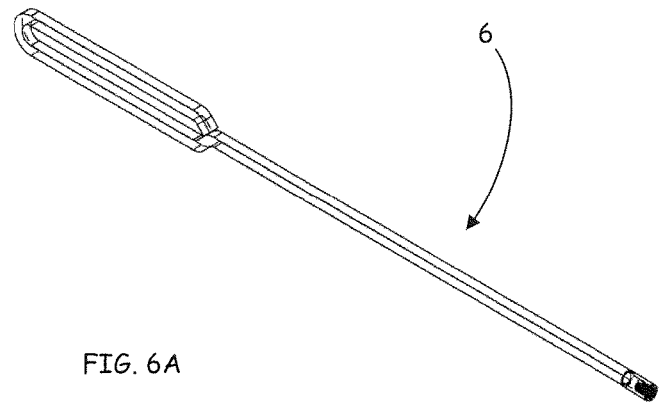
FIG. 6A is a side perspective view of a handle of the present invention
Figure 6B:
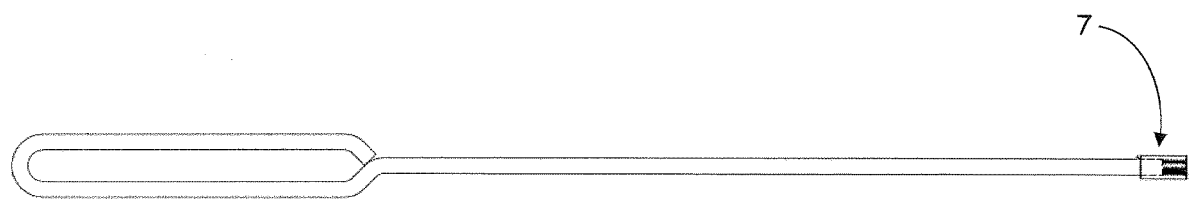
FIG. 6B is a top view of the handle of the present invention.
Figure 6C:
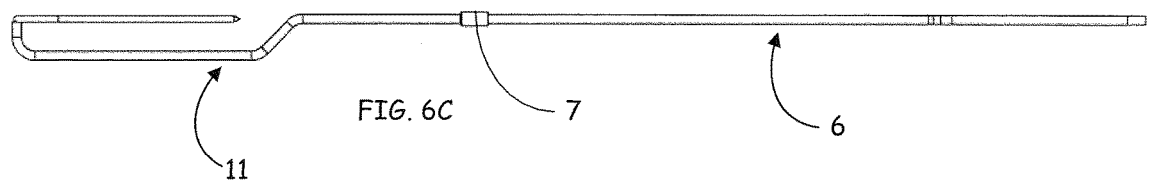
FIG. 6C is a side view of the handle connected to the skewer assembly according to an embodiment of the support device.
Figure 6D:
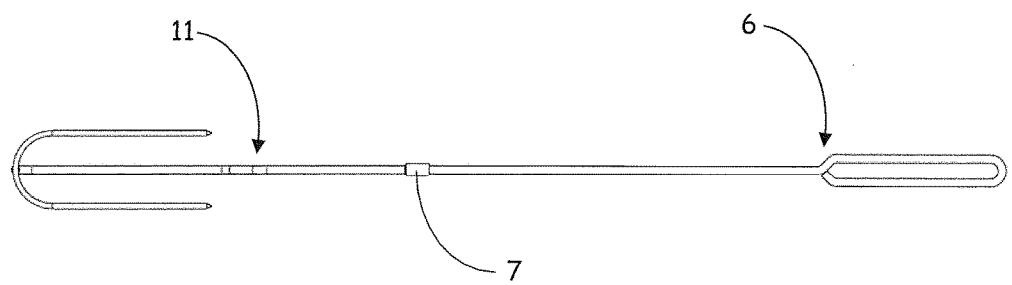
FIG. 6D is a top view of the embodiment illustrated in FIG. 6C.
Figure 7A:
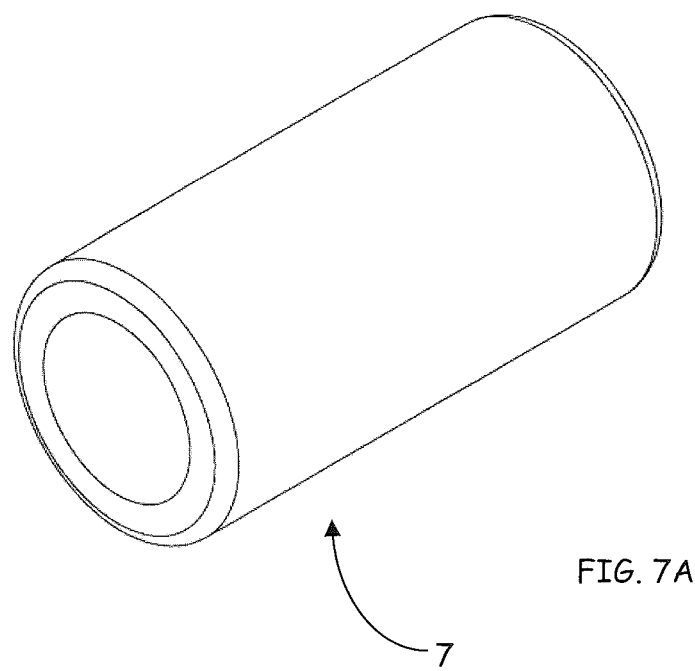
FIG. 7A is a perspective view of a handle to skewer connector of the support device.
Figure 7B:
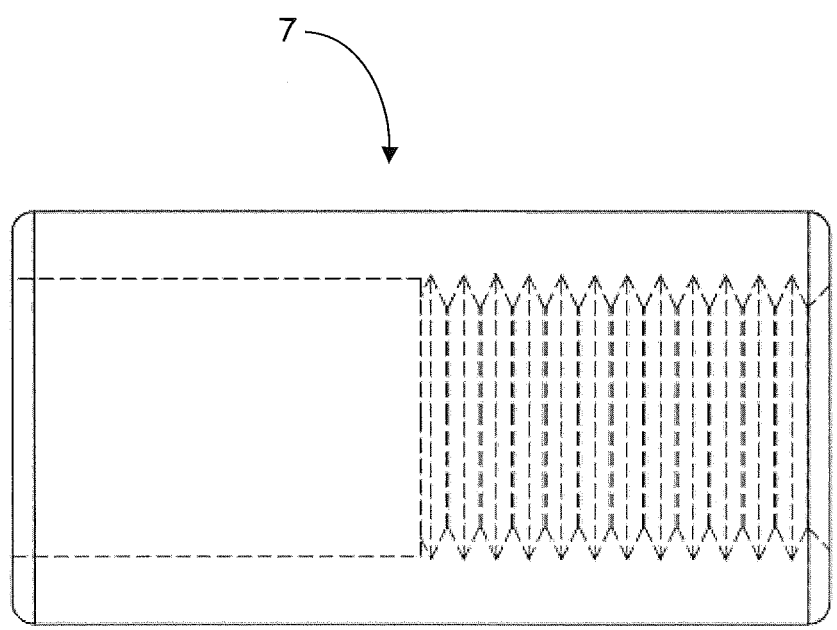
FIG. 7B is a cross-sectional view of the handle to skewer connector of the support device.

As illustrated in further detail in FIG. 5, the top stake 3 is a length of metal tubing or extruded metal tube with a looped upper terminal end providing a handle for ease in assembly, use and/or repositioning of the stake assembly. The lower terminal end of the top stake is threaded for secure connection to the bottom stake 4.

The skewer assembly 14 also includes a handle 6 removably connected to a skewer 2. The assembly 14 is selectively attached to the stake assembly 12 by connection with the clamp 1. The stake assembly 12 is positioned upright proximate the heating source while the skewer assembly is attached substantially perpendicularly thereto such that the skewer 2 extends at a selected height over the heat source to cook the food attached to the skewer 2.

As illustrated in further detail in FIGS. 6A-6D, the handle 6 is constructed of a lightweight metal such as aluminum. The handle is a length of metal rod or tubing having a wider end with an opening providing a handle for gripping the skewer. The opposing end of the handle is adapted for slidable and extensible connection with the skewer 2 via connector 7.

All of the components of the grilling device illustrated at 10 in FIG. 1 can be constructed of stainless steel, aluminum or similar materials which can withstand heat and direct exposure to flames with minimal oxidation while maintaining sturdiness and portability.

Although the present invention has been described with reference to preferred embodiments, workers skilled in the art will recognize that changes may be made in form and detail without departing from the spirit and scope of the invention.

What is claimed is:

1. An apparatus for grilling food over an open heat source, the apparatus comprising:

a stake for securing to a ground surface proximate a heat source;

a skewer configured for adjustable connection with the stake; and a clamp configured to secure the skewer to the stake in a selected position with respect to the stake such that the skewer is substantially perpendicularly secured to the stake and extends substantially horizontally and over the heat source, and wherein the clamp is a unitary construction comprising two longitudinally spaced apart opposing arm extensions extending in a same direction away from a connection point and wherein the arm extensions of the clamp contact the skewer at two locations that are offset from one another along a length of the skewer, and wherein terminal ends of the arm extensions each have a geometry configured to support the skewer in a position spaced apart from the stake and wherein a first arm extension contacts the skewer from below the skewer and the second arm extension contacts the skewer from above the skewer such that the clamp secures the skewer to a same side of the stake such that the skewer is spaced apart from a connection of the clamp and the stake and the skewer is prevented from lateral movement with respect to the stake and heat source.

2. The apparatus of claim 1 wherein the stake comprises a length having an upper end and a lower end and wherein the lower end is configured for insertion into the ground surface to secure the stake in an upright position.

3. The apparatus of claim 2 wherein the upper end of the stake is configured for connection to an extension piece configured to increase the length the stake for securing a skewer at an elevated height over the heat source.

4. The apparatus of claim 1 where in the skewer comprises a length having a first end and a second end, wherein a first end is configured to support food for grilling and a second end wherein the second end is configured with a connector element.

5. The apparatus of claim 4, and further comprising an extension piece configured for connection with the second end of the skewer via a complimentary connector element on a first end of the extension piece and a second end of the extension piece comprising a handle.

6. The apparatus of claim 5, wherein the handle is configured to allow a user to selectively rotate the handle to rotate the skewer and thus rotate the food for even grilling.

7. The apparatus of claim 1, wherein the clamp comprises a biased spring.

8. The apparatus of claim 1 wherein the clamp is vertically adjustable along a length of the stake such that the vertical position of the skewer over the heat source is adjustable.

\* \* \* \* \*